Dec. 29, 1953 W. B. COONS 2,664,129
FRUIT FEEDING, IMPALING, PEELING, TRIMMING,
CELLING, CORING, AND SPLITTING APPARATUS
Filed June 12, 1950 8 Sheets-Sheet 1
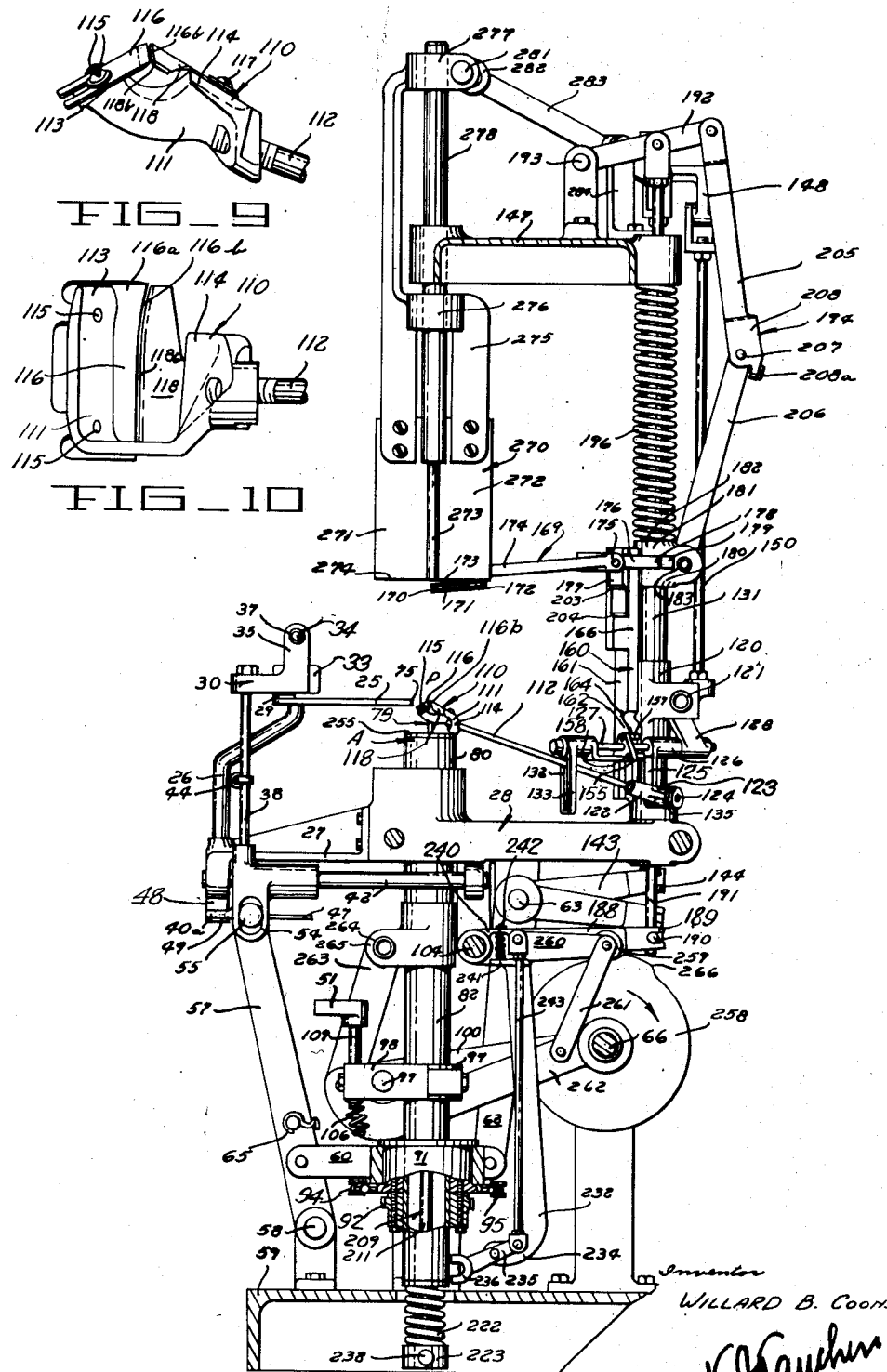

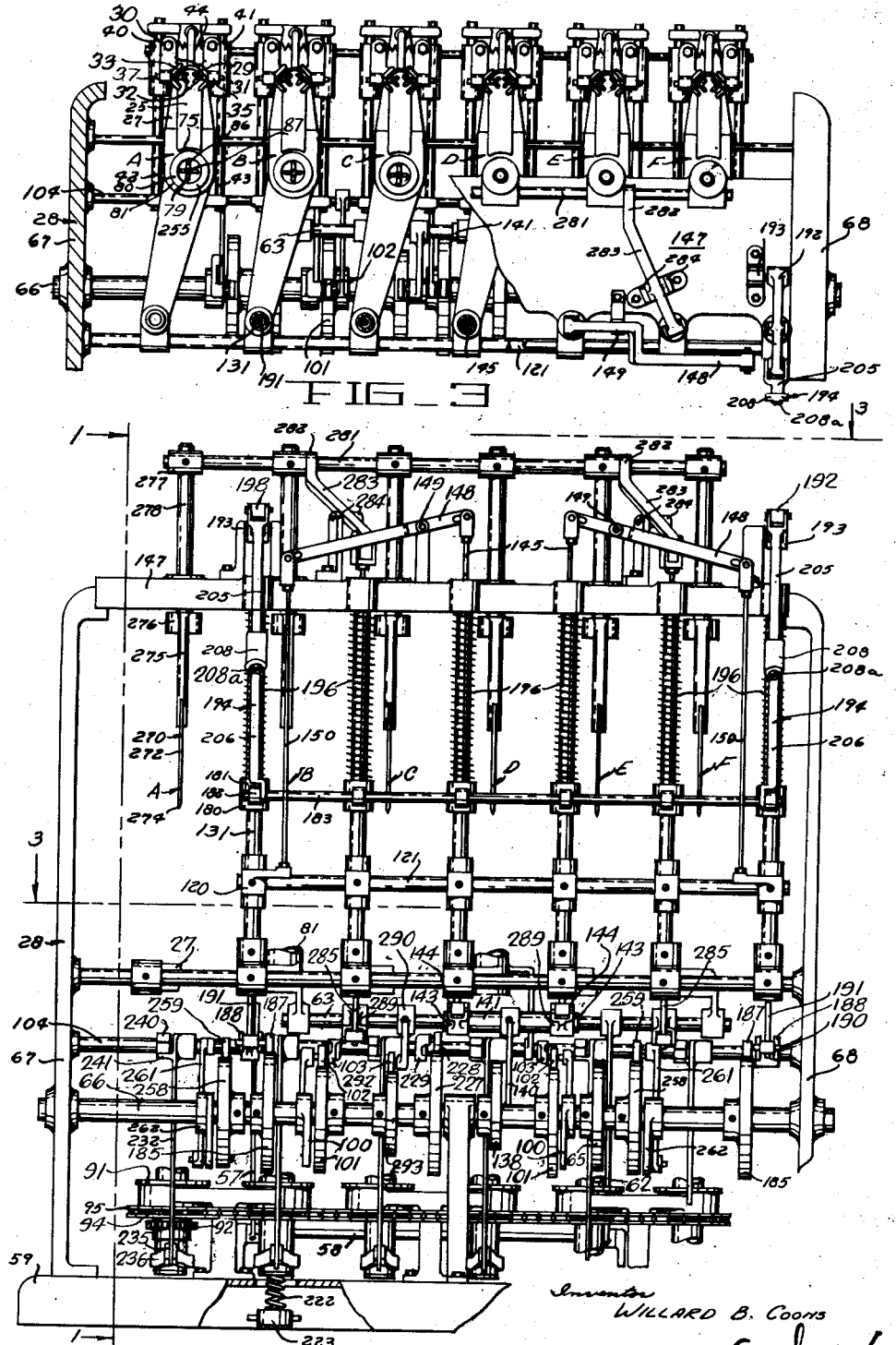

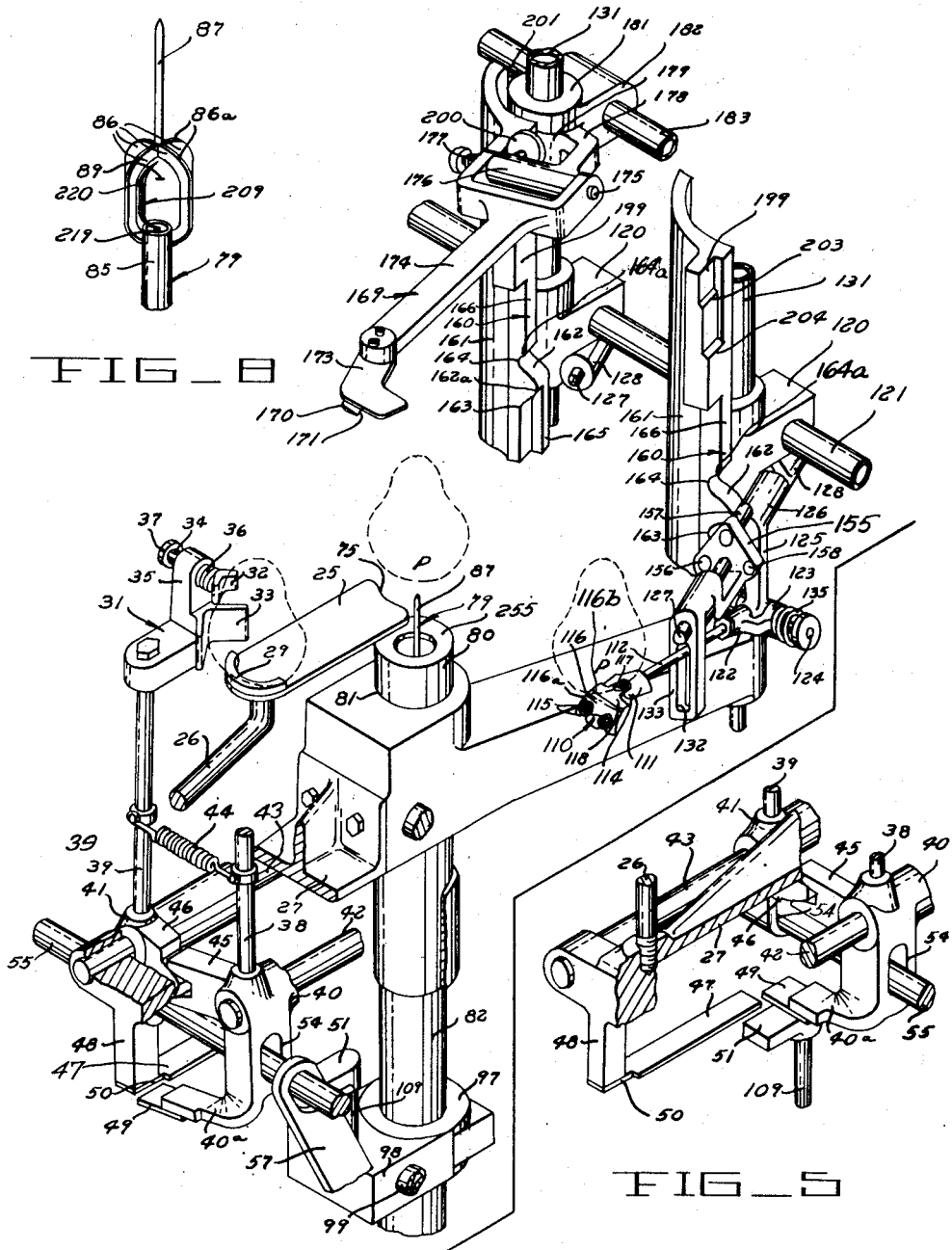

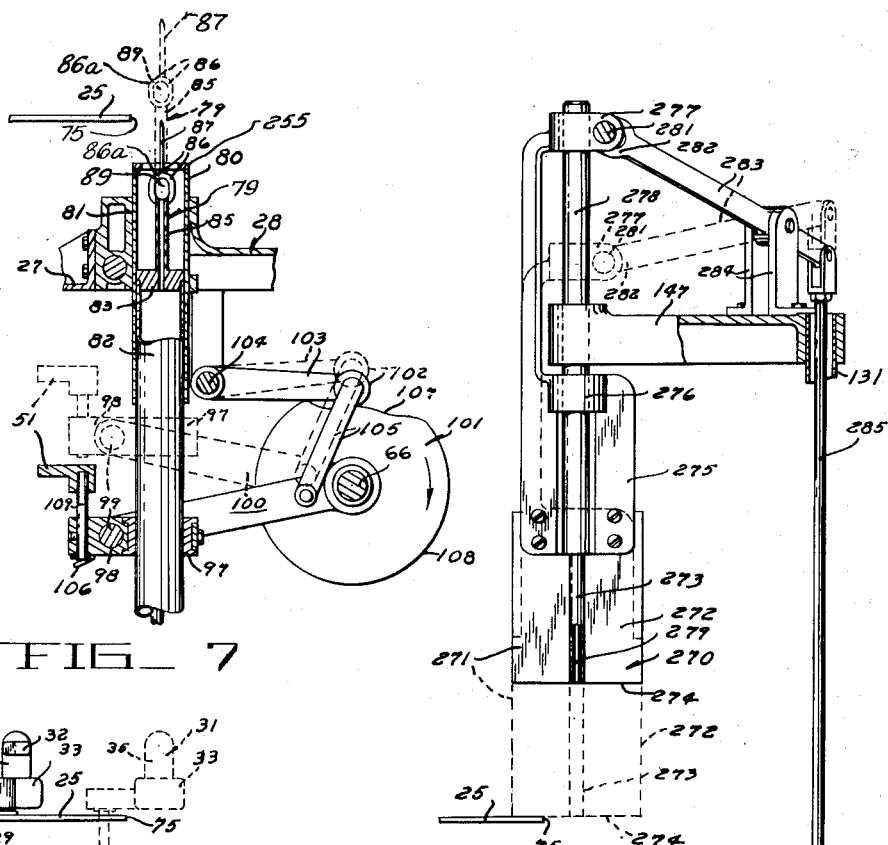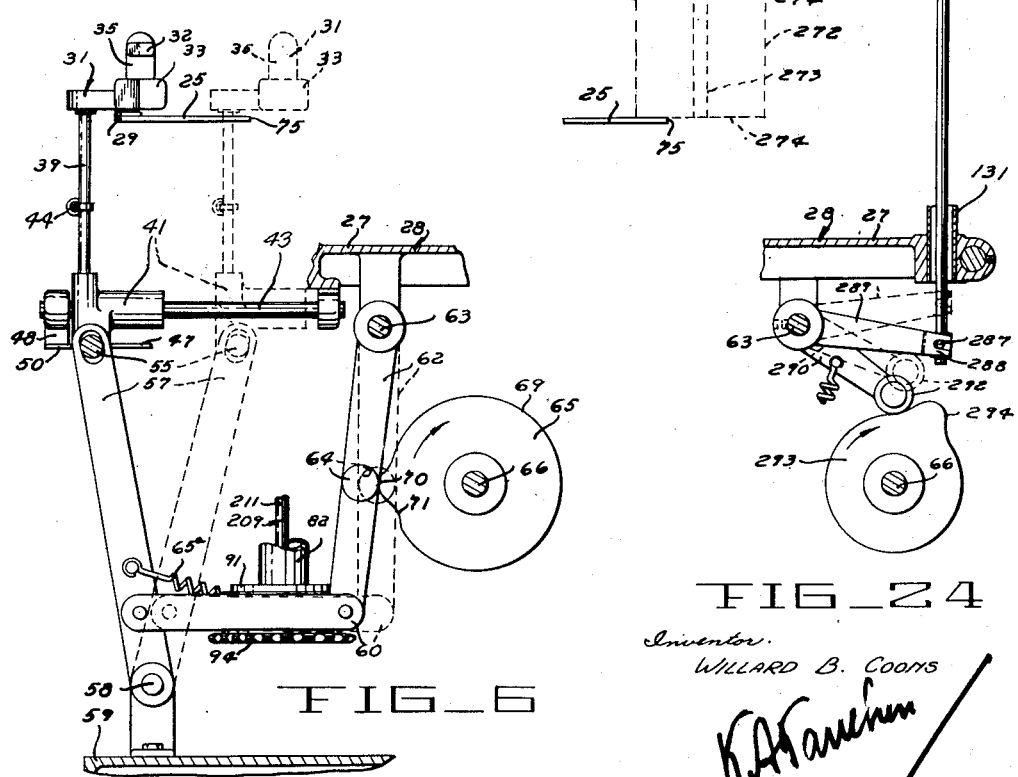

Dec. 29, 1953   W. B. COONS   2,664,129
FRUIT FEEDING, IMPALING, PEELING, TRIMMING,
CELLING, CORING, AND SPLITTING APPARATUS
Filed June 12, 1950   8 Sheets-Sheet 5
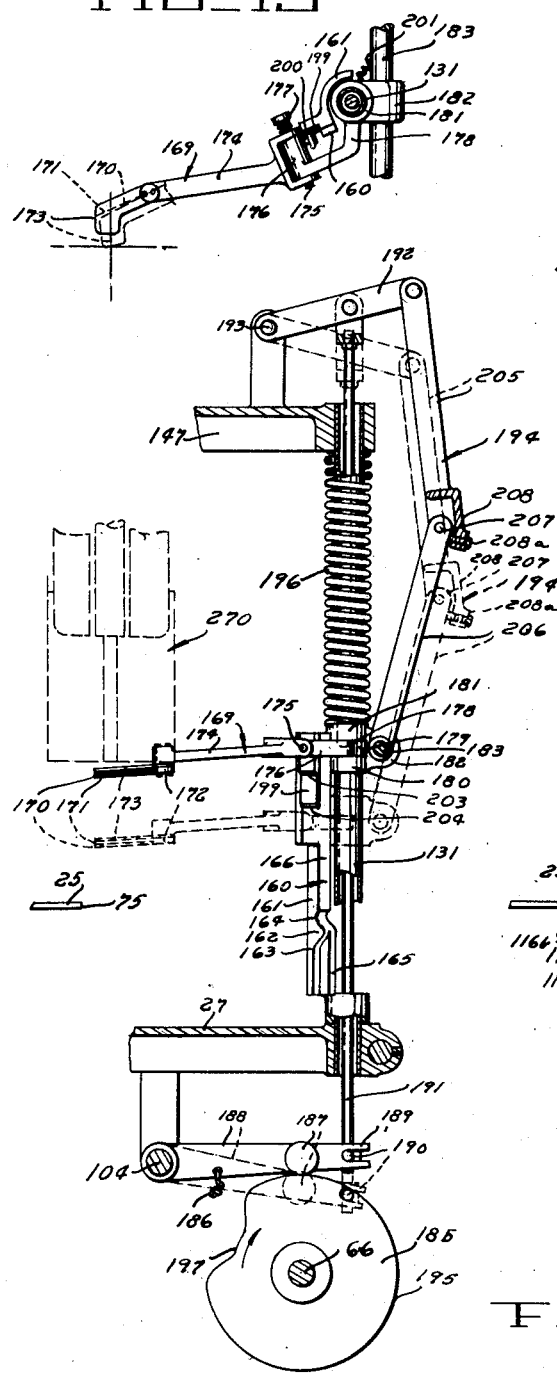
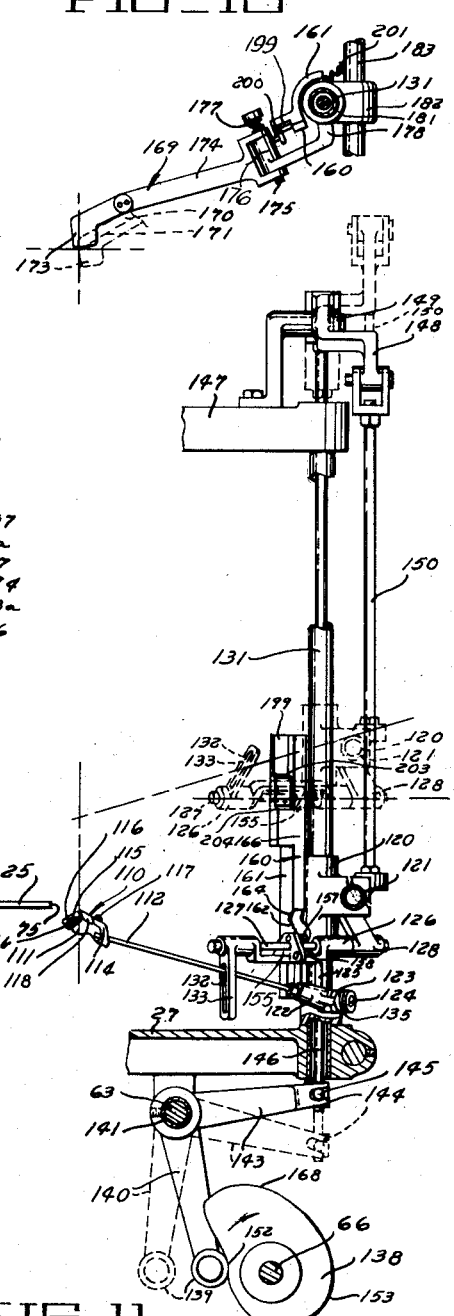
FIG_15
FIG_16
FIG_14
FIG_11
Inventor
WILLARD B. COONS
Patent Agent Dec. 29, 1953
W. B. COONS
2,664,129
FRUIT FEEDING, IMPALING, PEELING, TRIMMING,
CELLING, CORING, AND SPLITTING APPARATUS
Filed June 12, 1950
8 Sheets-Sheet 6
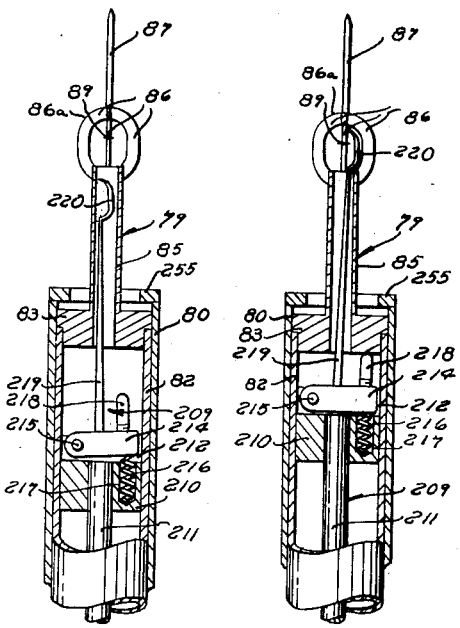
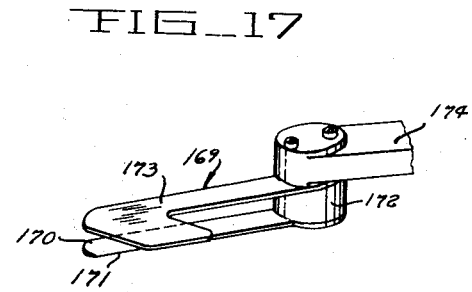
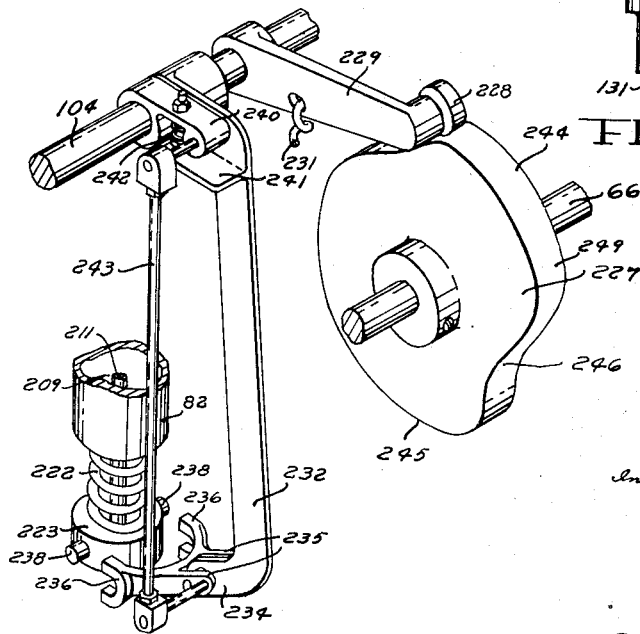
Inventor
WILLARD B. COONS

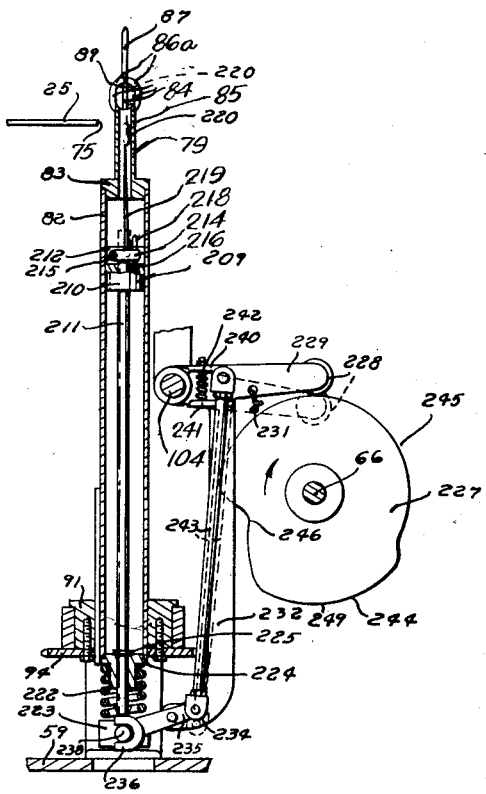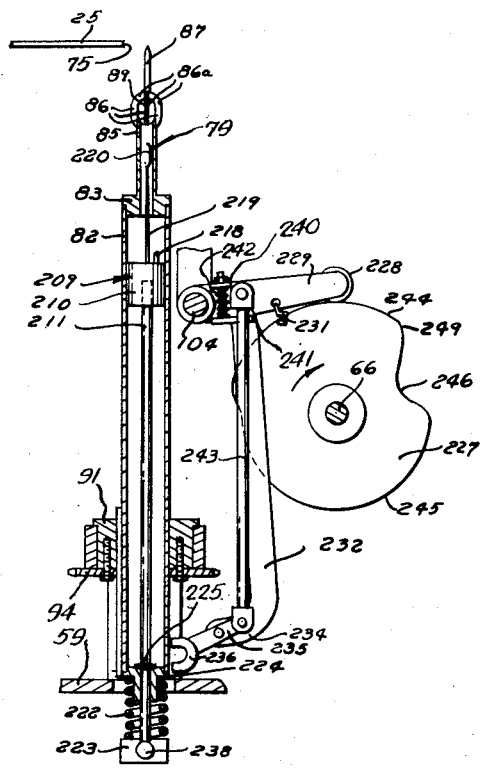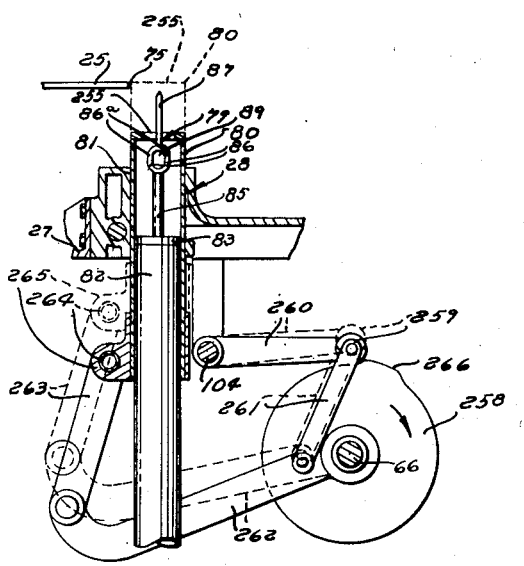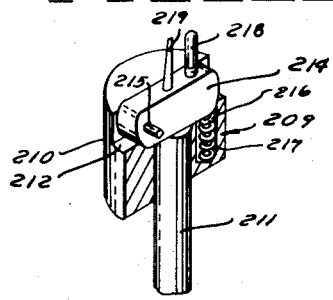

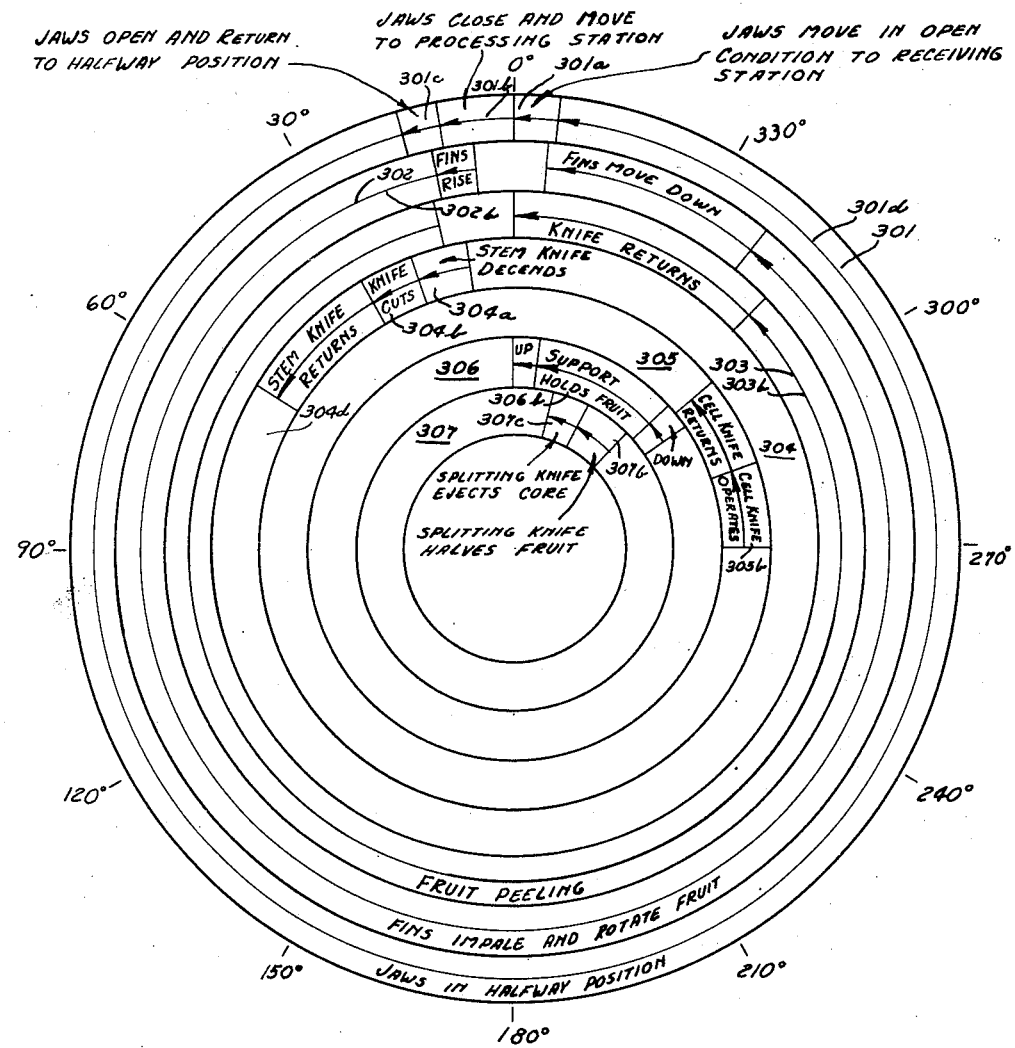
FIG_26

Patented Dec. 29, 1953

2,664,129

UNITED STATES PATENT OFFICE 2,664,129

FRUIT FEEDING, IMPALING, PEELING, TRIMMING, CELLING, CORING, AND SPLITTING APPARATUS

Willard B. Coons, Santa Clara, Calif.

Application June 12, 1950, Serial No. 167,502

15 Claims. (Cl. 146—52)

1

The present invention relates to the art of preparing pears, apples and like fruit for canning. Before fruit of this type is ready for canning it must be peeled, seed celled, cored, trimmed and stemmed and is usually sliced into two or more segments, and the present invention aims to provide a machine which will automatically perform all the mentioned fruit-preparing operations.

It is an object of my invention to provide a fruit preparing machine, of the type referred to, which combines high efficiency of operation with simplicity of mechanism.

Another object of my invention is to provide a machine of the type characterized which processes pears, apples and like fruit, preparatory to canning, with a minimum of waste so that it yields a high number of cases of canned fruit per ton of processed fruit.

Still another object of my invention is to provide a machine, of the type referred to, that will complete all the above mentioned fruit-preparing operations in a minimum of time.

An additional object of my invention is to provide a fruit-preparing machine which is of such construction that the overall time required for properly and completely processing an individual pear, apple or like fruit, is materially reduced as compared with the known fruit preparing machines, and yet the actual peeling operation is arranged to proceed so slowly as to hold waste of fruit flesh incurred in peeling at a minimum.

One of the specific objects of the invention is to provide a machine, of the type referred to, which is of such construction that all the above named fruit preparing operations are carried out without the necessity of transferring the fruit to different processing stations so as to reduce the danger of bruising, or otherwise injuring, the fruit to a minimum. In this connection it is another specific object of my invention to provide a fruit processing machine, of the type referred to, which is of such construction that all the above named fruit preparing operations are carried out with the fruit remaining in the same place and position within the machine.

Furthermore it is an object of my invention to provide a fruit processing machine, of the type referred to, that will satisfactorily perform, whether the individual specimens of the processed fruit are soft or hard.

An additional object of the invention is to provide a machine, of the type referred to, that will satisfactorily perform on fruit of varying sizes so that there is no need to grade the fruit prior to delivering it to the machine.

Still another object of my invention is to arrange a fruit processing machine, of the type referred to, in such a manner as to provide a maximum time interval for delivering the fruit to the receiving end of the machine, without reducing the effective fruit-processing phase of its operational cycle, so that a plurality of said machines may be combined into a synchronously operating unit that can readily be supplied by a single operator.

Yet another object of my invention is to provide an improved seed-celling mechanism for fruit preparing machines of the type referred to. In this connection it is a specific object of my invention to provide holding means for pears, apples and like fruit which engage the interior of, and are adapted to rotate, the fruit about its center axis, without interfering with the operation of a seed-celling knife.

Furthermore, it is an object of the invention to provide improved means for cutting off the stem ends of pears. In this connection it is a specific object of my invention to provide an improved mechanism, of the type referred to, that is adapted to cut off the stem ends of pears along a substantially horizontal plane and at uniform depth measured from the tip of the fruit disregarding variations in the height of the individual specimens thereof.

These and other objects of my invention will be apparent from the following description of the accompanying drawings which illustrate a preferred embodiment thereof and wherein Figure 1 is an elevation of a vertical longitudinal section through a multiple pear-processing machine embodying my invention, taken along line 1—1 of Figure 2;

Figure 2 is a rear elevation of said machine comprising six ganged fruit processing units with certain stationary components of said units omitted to show more clearly the moving components thereof;

Figure 3 is a fragmentary plan view of a horizontal section through the machine, taken along line 3—3 of Figure 2, with certain parts broken away to expose structure underneath.

Figure 4 is a fragmentary perspective of one of the fruit processing stations of the machine;

Figure 5 is a fragmentary perspective illustrating a detail of the fruit centering and feed mechanism shown in Figure 4;

Figure 6 is a side elevation, partly in section, which illustrates the fruit centering and feed mechanism and its power train;

Figure 7 is a side elevation, partly in section, which illustrates the rotary fruit holding mechanism and its power train;

Figure 8 is a perspective of the top end of said fruit holding mechanism;

Figure 9 is a side elevation of a fruit-peeling knife;

Figure 10 is a bottom plan view of said fruit-peeling knife;

Figure 11 is a side elevation, partly in section, which illustrates the carriage for the peeling knives and the power train for said carriage;

Figures 12 and 13 are fragmentary side elevations of mechanism arranged to control the operation of the peeling knives, illustrating different operational positions thereof;

Figure 14 is a side elevation, partly in section, which illustrates the mechanism for cutting off the stem end of a pear and the power train therefor;

Figures 15 and 16 are fragmentary plan views illustrating different operational positions of the stem-end-trimming knife that forms part of the mechanism illustrated in Figure 14;

Figure 17 is a perspective of said stem-end-trimming knife;

Figures 18 and 19 are side elevations, partly in section, illustrating the seed-cell-removing mechanism and the power train for said mechanism in different operational positions;

Figure 20 is a fragmentary perspective of the power train for said seed-cell-removing mechanism;

Figures 21 and 22 are side-elevational detail views illustrating the seed-celling knife in different operational positions;

Figure 23 is a perspective illustrating the manner in which said seed-celling knife is mounted;

Figure 24 is a side-elevational view, partly in section, of the fruit-splitting mechanism and the power train therefor;

Figure 25 is a side-elevational view, partly in section, of mechanism arranged to support the fruit while it is split by the mechanism illustrated in Figure 24, and Figure 26 is a phase diagram illustrating the sequence and duration of operation of the various fruit-processing mechanisms during a single operational cycle of the machine.

The machine illustrated in Figures 1, 2 and 3 comprises six ganged processing units A, B, C, D, E and F, which are of identical construction and which operate synchronously and in an identical manner to position, peel, trim, seed-cell, and core pears, and to cut off their stem ends and split them into halves. In the following description it will, therefore, be usually sufficient for an understanding of the construction and operation of the machine, to refer to one of said units only, except in those instances where corresponding ones of the various mechanisms comprised in the several units are arranged to be driven through a common power train and from a common source of power.

Having first reference to Figure 1, which illustrates the first of said ganged processing units identified by the letter A in Figures 2 and 3, a pear to be processed by said unit is first placed with its calyx or blossom end down upon the front end of a horizontal feed or fruit-receiving plate 25 that is mounted upon an arm 26 which rises from an intermediate horizontal deck portion 27 of the stationary machine frame 28. To provide a proper seat for pears placed on said plate, a raised rim 29 of horse-shoe shape may be arranged along its rounded front edge, as more clearly shown in Figure 4. Opposing jaws 30 and 31 are positioned at either side of the receiving plate 25, and are arranged to grip the pear and slide it along the plate to the actual processing station that is located directly beyond the rear end of said plate and is marked by the letter P in Figures 1 and 4. Having reference to Figures 3 and 4, each of said jaws has inwardly diverging upper and lower clamps 32 and 33, respectively, which are displaced in a direction laterally of the receiver plate 25 with the upper clamps 32 closer approached to the center line of said plate than the lower clamps 33 so as to conform to the natural shape of a pear. The lower clamps 33 may form integral parts of their respective jaws but the upper clamps 32 are preferably formed on the inner ends of horizontally positioned bolts 34 that are slidably received in suitable apertures provided in risers 35 of said jaws, with coil springs 36 interposed between the clamps and said risers to yieldably urge said clamps toward one another to an extent determined by stop heads 37 arranged on the projecting outer ends of said bolts. The jaws 30 and 31 are firmly mounted upon the upper ends of vertical standards 38 and 39, respectively, which rise from suitable bosses formed in slide blocks 40 and 41. Said slide blocks are supported for rotational as well as longitudinally sliding movement upon two horizontally extending guide rods 42 and 43 that extend below and parallel to the receiver plate 25 at either side thereof, with their ends suitably supported in bosses formed in the aforementioned intermediate portion 27 of the machine frame, as best shown in Figures 1 and 3. Means are provided to move the slide blocks 40 and 41 forwards and backwards upon the guide rods 42 and 43, with the jaws 30, 31 in closed or fruit-gripping position during their forward movement towards the processing station P, and in open or fruit-receiving position during their return movement to the rimmed front end of the receiver plate 25.

To urge the jaws 30 and 31 into closed position, a spring 44 is tensioned between the standards 38 and 39 and the slide blocks 40 and 41 are provided with enmeshed gear segments 45 and 46 to insure uniformity of any rotational movement of said blocks upon their guide rods 42 and 43 in response to the urging of said spring 44. Whenever the blocks 40, 41 move toward the front end of the machine, however, they are latched in a position in which the jaws are in open or fruit-receiving condition. For this purpose a horizontal ledge 47 is rigidly supported from a downwardly extending arm 48 of the aforementioned intermediate deck 27 of the machine frame and extends below the level of the slide rods 42, 43 parallel to the plate 25 over a distance equal to the length of said plate, as best shown in Figure 5. One of the slide blocks, say block 40, is provided with an arm 40a that carries a horizontal slipper plate 49 which is adapted to engage ands lide along the ledge 47. Whenever said slipper 49 overlies said ledge 47, the slide blocks 40, 41 are unable to follow the urging of the spring 44 and the jaws 30, 31 remain in open position. The front end of the ledge 47 is recessed, however, as shown at 50 in both Figures 4 and 5, and whenever the slide blocks are moved to the front end of the machine, the slipper 49 drops through said recess 50 from the ledge 47 and, thus, permits the spring 44 to pull the standards 38 and 39 together, which closes the jaws 30 and 31 on any fruit that may be positioned intermediately of said jaws at the moment, as illustrated in phantom lines in Figure 4. Thereafter, when the slide blocks are moved toward the rear end of the plate 25, the slipper 49 travels underneath the ledge 47 and as a result thereof the jaws remain closed. However, when the jaws have reached their rearmost position in which they hold the pear beyond the rear end of the receiving plate 25, the slipper 49 has advanced beyond the length of the ledge 47, and as the actual fruit preparing instruments enter into operation on the pear, a shelf 51 is arranged to rise from underneath the slipper 49 in a manner to be presently described and lifts said shelf 49 to its original level above the ledge 47, which forces the jaws 30 and 31 apart against the urging of the spring 44. As will presently appear, the shelf 51 is arranged to remain in its elevated position sufficiently long to cause the slipper 49 to slide onto the upper surface of the ledge 47 as the blocks 40, 41 are withdrawn to the front end of the machine so that the jaws 30, 31 will remain in open or fruit-receiving position during their return movement until the slipper 49 reaches, and drops again through, the recess 50 at the front end of the ledge 47.

For moving the blocks 40 and 41 in unison forwardly and backwardly on the guide rods 42 and 43, each of said blocks is provided with an elongated slot 54 and through the slots 54 of all the slide blocks comprised in the machine extends a transverse ganging rod 55. Said transverse ganging rod is engaged in the slotted upper ends of a pair of actuating levers 57 which are firmly mounted upon a transversely extending horizontal shaft 58 that is rotatably supported from the pedestal 59 of the machine, as shown in Figures 1 and 6. A link 60 pivotally connects one of said actuating levers 57 to the lower end of a cam follower lever 62 which is journalled on a transverse pivot shaft 63 that is suitably supported from the aforementioned intermediate deck 27 of the machine frame. Said lever 62 carries a cam follower roller 64, pivoted to an intermediate point thereof, and said roller 64 engages the edge of a control cam 65 under the force of spring means 65a tensioned, for instance, between one of the actuating levers 57 and a suitably positioned stationary point of the machine frame, as shown in Figure 6. The control cam 65 is firmly mounted upon a shaft 66 that extends transversely of the machine and which is suitably journalled in side members 67 and 68 of the machine frame 28, as shown in Figures 2 and 3. As will appear from the following description of the machine, said shaft 66 carries the motion-control cams of all the fruit-processing implements comprised in the machine and will, therefore, be hereinafter referred to as the main or program shaft of the machine. It may be driven through an appropriate clutch and a reduction gear train (not shown) from any suitable source of power, such as for instance, an electric motor (likewise not shown).

The major portion of the control cam 65 is of circular contour, as indicated at 69, except for a solitary lobe 70 which is directly followed by a depression 71 of relatively short duration, and the control cam 65 is mounted in such an angular position upon the program shaft 66 that at the beginning of each operational cycle of the machine its lobe 70 engages the roller 64 which holds the described train of links and levers in the backward position illustrated in full lines in Figure 6 in which the jaws 30, 31 are held at the front or fruit-receiving end of their respective fruit-receiving plates 25 against the urging of the spring 65a, and wherein they close to grip any fruit that may be supported upon the horse shoe rim 29 thereof, in the manner previously described. As the program shaft 66 turns in clockwise direction, as viewed in Figure 6, the roller 64 drops from the lobe 70 into the depression 71 permitting the described mechanism to advance rapidly under the force of the spring means 65a into the position shown in broken lines in Figure 6 wherein the clamps of the jaws holds gripped fruit within the focal point P (Figure 4) of the actual fruit processing operations, with the center axis of said fruit extending a limited distance rearwardly of the concave rear edge 75 of the fruit-receiving plate 25. When the jaws 30, 31 are in this position the aforementioned shelf 51 becomes effective to open said jaws and release the gripped fruit. Immediately thereafter the cam follower roller 64 climbs upon the circular sector 69 of the cam 65 and causes said jaws to withdraw in open condition from the rear end of the plate 25 and dwell over the major part of each operational cycle of the machine at an intermediate position adjacent to the center region of said plate to afford an operator the maximum possible time for placing a new pear upon the rimmed front end of said plate. At the end of each operational cycle, however, the roller 64 encounters again the lobe 70 and causes the jaws to move in open condition to the front end of the plate 25 where they close automatically on any fruit positioned on said plate in the manner previously described.

During the short interval when the jaws 30 and 31 hold a pear with its vertical main axis positioned a limited distance beyond the rear end of the receiver plate 25, means collectively identified with the reference numeral 79 enter into operations which impale the pear from below along its main axis and which maintain said pear at the level determined by the plate 25, after the jaws have released their hold thereon, and spin it rapidly around its main axis. For this purpose a tube 80 (Figures 7 and 25) is mounted for vertically sliding movement within a cylindrical aperture 81 provided in the aforementioned horizontal deck portion 27 of the machine frame, with its upper end normally disposed below the level of the fruit receiving plate 25, and concentrically received within said tube 80 for rotational as well as axially sliding movement relative thereto, is another tube 82. Mounted upon the upper end of said last mentioned tube 82, within the first mentioned tube 80, is a plug 83 from which rises concentrically an open ended tubular stem 85 that carries upon its upper end a plurality of radially projecting fins 86 in the form of semi-circular straps. Supported from the converging upper ends of said fins is an axially extending point or spike 87, and though fitting within the outer tube 80, as shown, said fins 86 are of such size and conformation as to define an intermediate spheroidal space at least equal in size to the maximum-sized seed cell of the fruit for which the machine is designed. In the preferred embodiment of my invention, as illustrated in Figure 8, the stem 85 carries four such fins 86 arranged in two vertical planes positioned normal to one another and the upper arcuate edges 86a of the fins 86 may be sharpened in the manner of knives so that they may readily penetrate into the body of the fruit.

During operation of the machine the described implement 79 is held in a continuous state of rotation about its center axis. Having specific reference to Figure 1, which shows the device 79 comprised in the rightmost one of the fruit processing units (as viewed from the feed end of the machine) the lower end of the tube 82 is slidably keyed to a hub 91 for vertical movement relative to said hub and bolted to said hub is a gear 92 to which rotary power may be applied through a suitable train of gears (not shown) from the same source of power that drives the program shaft 66 or any other suitable source of rotary power. To rotate all the devices 79, comprised in the machine, in unison a sprocket 94 is bolted to the hub 91 of every one of the tubes 82 and all the sprockets 94 comprised in the machine are operatively connected by a common sprocket chain 95 (Figures 1 and 2).

To elevate the described implements 79 into their operative positions, a flanged hub 97 firmly secured to each of the rotating tubes 82 is rotatably supported within a bearing block 98 (Figure 7) and all the bearing blocks 98 comprised in the machine are loosely mounted upon a transverse ganging shaft 99. Said shaft 99, in turn, is supported in the slotted ends of a pair of levers 100 (only one of which is visible in Figure 7) that are loosely journalled on the above mentioned program shaft 66. Keyed to said program shaft adjacent to each lever 100 is a control cam 101, the edge of which is engaged by a cam follower roller 102 pivoted to the end of an arm 103 that turns on a transverse pivot shaft 104 which is rotatably supported from the intermediate deck portion 27 of the machine frame. An interponent 105 pivotally connected between the roller-carrying end of the arm 103 and an intermediate point of the lever 100 effectively transmits the variations in the position of the roller 102 against the urging of a spring 106, that may be tensioned between one of the blocks 97 and a suitable point of the machine frame. The lever 100 in this manner varies the elevational position of the implements 79 in accordance with the variations in the contour of the cam 101. Each of said control cams 101 has a single depression 107 of less than 90° in angular width corresponding to a position of the rotary holding implements 79 in which they are retracted with the points of their spikes 87 disposed flush with or slightly below the level of the fruit receiving plates 25, as shown in full lines in Figure 7. The remaining portion 108 of the cam is of circular contour corresponding to a position in which the fins 86 of the holding implements are raised a limited distance above the level of the fruit receiving plates 25, as shown in broken lines in Figure 7. In constructing a machine in accordance with my invention this distance must be carefully predetermined depending upon the type of fruit that is to be processed by the machine, so that the fins 86 will, in their uppermost position, encircle the seed cell of the fruit as it is held by the jaws 30 and 31 with its bottom end at the level of the fruit receiver plate 25. For instance I have found that in pears, that are used for canning, the center of the seed cell is always located about ⅞ of an inch above a flat supporting surface on which the pear is placed with its calyx end down. Therefore, in machines intended to process pears I arrange matters in such a manner that the rotary holding implements 79 rise to an altitude wherein the center point 89 of the spheroidal space defined by the fins 86 is located ⅞ of an inch above the level of the fruit receiver plates 25.

By properly adjusting the angular position of the cam 101 on the program shaft 66 relative to the hereinbefore described jaw control cam 65, with the rollers 102 positioned near the counter-clockwise end of the depression 107 when the program shaft 66 is in the full cycle position, the rotary holding implements 79 may be arranged to rise at the very moment when the jaws 30, 31 have moved beyond the rear end of the fruit receiving plate 25 and hold a fruit, with its calyx end down, directly above the spike 87.

It will be understood that the jaws 30, 31 must not release the fruit until it is properly impaled upon the fins of the rotary impeller 79, and in order that the fruit may follow, without injury to its interior or to its surface, the rotational momentum imparted to it by the rotating fins of the impeller implement, as said fins penetrate into its interior, the inner faces of the clamps 32 and 33 must be of a smoothly rounded contour and the strength of the spring 44 which effects the closing of the jaws must be so proportioned that while it is strong enough to cause the jaws to properly grip and center the fruit, it is not so strong as to obstruct rotation of the pears within the clamps. After a fruit has been fully impaled upon the impeller device, however, with the fins 86 surrounding the seed cell of the pear, it is time for the jaws to release the fruit, and in order that said release may be properly timed with the completion of the impeller-fin-impaling operation, the aforementioned jaw-release shelves 51 are adjustably mounted by means of suitable stems 109 upon the same blocks 98 which raise the rotating tubes of the holding implements 79, such that said shelves will have lifted their respective slippers 49 back to the upper level of the ledges 47 at the very moment when the fins 86 of the rotary holding implements are properly impaled in the fruit.

Operating in each of the pear processing stations is a peeling knife 110, as shown in Figures 1 and 4. Each of the peeling knives comprises a base bracket in the form of an arched member 111 that is mounted upon the end of a rod 112, as more clearly shown in Figures 9 and 10. The opposite ends of said arched member are bent laterally to form relatively inclined supporting shelves 113 and 114. Adjustably mounted upon the supporting shelf 113 at the free end of the arched member 111 by means of screw bolts 115, is the peeling blade 116 the outer segment of which is slightly curved, as shown at 116a (Figure 10) and which projects with its cutting edge 116b beyond the inner edge of said supporting shelf 113 at the concave side of the arched base member 111. Adjustably secured to the supporting shelf 114 at the opposite end of the arched member 111 by means of a screw bolt 117 is an arched guard or guide plate 118, the inner edge 118b of which terminates adjacent to, and slightly below, the edge 116b of the peeling blade. As will readily be understood, the clearance between the edge of the peeling blade 116 and the edge of the guard plate 118 and the extent to which the edge of the former projects beyond the surface determined by the latter, establishes the thickness of the peeling removed by the described knife structure 110 when said structure is held with said guard plate against the surface of a rotating pear.

Means are provided to yieldably urge the knife structure 110 against the surface of a pear impaled upon the rotary holding device 79 and to raise said knife structure 110 gradually from the calyx end to the tip of the pear while turning it appropriately about a horizontal axis so as to maintain its guard plate 118 in flat contact with the surface of the pear. For this purpose all the knife structures 110 comprised in the machine are mounted for universal movement in a carriage composed of blocks 120 mounted upon a transverse ganging rod 121 (Figures 1, 2 and 3) and said carriage is arranged to move from a lower to an upper position and return to said lower position during each operational cycle of the machine, and means are actuated by the defined movement of said carriage which appropriately control the angular position of said knives 110 as their elevational position is varied. Having reference to Figures 1, 4 and 11, each of the knife-carrying rods 112 is firmly mounted within a boss 122 formed on a bracket 123 that is rotatably supported upon a short shaft 124. In the position illustrated in Figures 1 and 4 which represent conditions at the commencement of an operational cycle, said shaft 124 lies substantially within a horizontal plane. Said shaft 124 is mounted in the end of an arm 125 which depends from a bracket structure 126 that turns on a horizontal axle 127 disposed at right angles to the shaft 124 and supported at its rear end in the lower end of an arm 128 that depends from one of the aforementioned blocks 120 which slidably engage vertical tubular posts 131 of the machine frame 28 and which are mounted for movement in unison upon a transverse rod 121 as hereinbefore described. At an intermediate point of its length the mounting rod 112 is received within the guide slot 132 of a guide frame 133 that extends radially of the axle 127 and is rigidly supported from the bracket structure 126 at the front end thereof. In Figures 1 and 4 which, as pointed out before, are illustrative of conditions at the beginning of an operational cycle of the machine, the guide slot 132 lies in a vertical plane and extends downwardly from the axle 127, and a suitable torsion spring 135 coiled about the shaft 124 and connected between said shaft and the bracket 123 urges the rod 112 yieldably into the upper corner of the guide frame 133. This positions the peeling knife 110 at a level somewhat below the feed plate 25 and sufficiently removed radially from the rotational axis of the described rotary holding mechanism 79 to avoid interference with the impeller fins 86 when said fins are raised into operative position as hereinbefore explained; and said knife structure 110 is secured to said mounting rod 112 in such a position, angularly of the axis of said rod, that its guard or guide plate 118 and the cutting edge 116b of its peeling blade 116 are presented upwardly, as illustrated in Figures 1 and 4.

Directly after the rotary holding mechanism 79 has been raised into operative position, in the manner hereinbefore explained, and has impaled a pear presented thereto by the jaws of the feed mechanism, means enter into operation that raise all blocks 120 from which the peeling knives are supported. For this purpose a snail cam 138 is keyed upon the program shaft 66, as shown in Figures 2 and 11. The edge of said cam 138 is engaged by a roller 139 pivoted to the free end of an arm 140 and said arm 140 is firmly mounted upon a sleeve 141 that turns on the aforementioned pivot shaft 63. Two arms 143 are securely mounted upon the sleeve 141 and engage with their forked free ends 144 studs 145 that project laterally from vertical rods 146 which rise concentrically through two of the aforementioned tubular posts 131 of the machine frame. The upper end of each of said rods 146 projects above the roof portion 147 of the machine frame and is pivotally connected to one end of a lever 148 (Figure 2) which is rotatably supported from said roof at an intermediate point 149 of its length. The opposite end of said lever is bent to project beyond the rear edge of said roof 147 and is pivotally connected to an actuating rod 150, and both the rods 150 provided in the machine are pivotally connected to respective ones of the aforementianed blocks 120 which, as hereinbefore described, are connected for movement in unison by the transverse rod 121 that carries all the remaining blocks 120 provided in the machine.

The control cam 138 is mounted in such angular position upon the program shaft 66 that its roller 139 engages the lowest point 152 of its edge at the beginning of each operational cycle of the machine, which locates the peeling knives 110 into the low position illustrated in Figures 1 and 4. The initial sector 153 of the snail cam 138 is of a very slight upward gradient only which is effective to raise the edges of the straight inner segments 116a of the peeling knives 110 into operative contact with the calyx ends of the pears by the time the pears have been impaled upon the holding implements 79, and gives them sufficient time to peel the horizontal bottom surface of the pears as said pears are rotated by said holding implements. Soon the cam follower roller 139 encounters markedly increasing radii 168 of the snail cam 138, however, which causes the blocks 120 to move upwards at a faster rate and raise the peeling knives 110 correspondingly. Means are provided to positively turn the mounting structure of each peeling knife about its axle 127 as the knives are raised by the upward movement of the blocks 120, so as to continuously adjust the position of the guard 118 of each knife from the substantially horizontal position illustrated in Figures 1 and 4 to positions parallel to the changing contour of the pear, and at the same time said means are effective to move each guide frame 133 from the vertical position illustrated in said Figures 1 and 4 into such angular positions as will enable the mounting rod 112 to yield radially away from the center axis of the pear against the urging of the torsion spring 135 so as to adjust the position of the peeling knife to the natural variations in the diameter of the pear, while maintaining it in operative cutting contact with the pear surface. For this purpose a triangular plate 155 is rotatably mounted upon the axle 127 and is rigidly connected to the bracket structure 126. The plate carries three studs 156, 157 and 158, respectively, each projecting laterally from one of its three corners. Said studs are arranged to coact with a camming surface 160 formed by a stationary member 161 in the shape of a tube segment that rises and is rigidly supported from the machine frame adjacent to each tubular post 131. Said camming surface has the form of a rack segment, as best shown in Figures 4, 12 and 13, comprising a single centrally position tooth 162 situated between a lower and an upper depression 163 and 164, respectively. With the blocks 130 in their lowermost position, the stud 156 at the triangle base is located in the lower recess 163 somewhat below the lower flank of the tooth 162 while the stud 157 at the apex of the triangle is located adjacent to and slightly below the apex 162a of said tooth 162. Said stud 157 is preferably longer than the studs 156 and 158 and its elongated end may be arranged to engage a laterally positioned vertical guide ridge 165 that is formed by the aforementioned member 161 and which terminates at the level of the apex 162a of said tooth 162, to prevent wabbling of the triangle 155 during the initial phase of its upward travel (Figure 12). As the operation of the snail cam 138 raises the peeling knife mounting assembly, the stud 157 rises above the tooth 162 while the stud 156, after a time sufficient for the knife to contact and peel the horizontal bottom surface of the pear, comes into contact with the lower flank 162b of said tooth 162 which cams it sideways and in this manner forces the triangular plate 155 and the frame structure 126 to turn on the axle 127 in counterclockwise direction from the position shown in Figure 12 to the position shown in Figure 13. As a result thereof the bracket 123, within which the mounting rod 112 of the peeling knife is held, is swung in an arc in counterclockwise direction, as viewed in Figure 4, so that the fruit contacting face of the knife structure 110 changes gradually from a substantially horizontal position to a substantially vertical position with the torsion spring 135 permitting the mounting rod 112 to yield within the guide frame 133 radially away from the main axis of said pear body while at all times maintaining the peeling knife in proper operative contact with the pear surface. As the blocks 120 continue to rise and the stud 157 descends into the upper recess 164 and finally comes against the ascending flank 164a of said recess, the triangular plate 155 is turned further in counterclockwise direction, as viewed in Figures 12 and 13, and as a result thereof the mounting rod 112 of the peeling knife 110 is swung further in counterclockwise direction, as viewed in Figure 4, until the third stud 158 strikes against the straight upper portion 166 of the camming surface 160. At this point further rotational movement of the knife mounting assembly is positively stopped in an angular position removed by about 135° from its original horizontal position, as indicated in broken lines in Figure 13, and the cutting edge of the peeling knife bears fully with both its straight inner and its curved outer sector 116a and 116c, respectively, upon the slightly concave neck or shank portion of the rotating pear.

When a peeling knife of the type described operates on the neck or shank portion of a pear which is of an only slightly concave contour, the width of the peeling removed from the pear will be greater than what it is when the knife operates on the decidedly convex lower half of the pear body. Consequently the peeling knife may be raised at a faster rate when operating on the upper half of a pear and accordingly the gradient of the snail cam 138 is arranged to become markedly steeper over its final sector, as indicated at 168 in Figure 11. At a point shortly before the full cycle position of the snail cam, however, when the peeling operation has been completed, the edge of the snail cam 138 drops abruptly to the initial radius which is effective to lower the peeling knives to their initial positions slightly below the level of the feed plates 25 and restore their initial angular position so that the peeling mechanism is ready for another operational cycle.

Referring to Figures 1, 3, 4 and 11, it should be noted that the various posts 131 of the machine frame which are slidably engaged by the blocks 120 are laterally displaced from the main axis of their respective fruit-processing stations (as viewed from the front or rear end of the machine) and that the mounting rods 112 extend obliquely to the opposite side of their respective pear processing stations so that the peeling knives engage the pears at points angularly displaced from a transverse vertical plane, containing the main axes of the various fruit processing stations, toward the rear end of the machine by an angle of about 30 degrees. I have found such an arrangement to be advantageous since it reduces the danger that the peelings shaved from the pears by the operation of the peeling knives may become entangled and interfere with the proper operation of the fruit preparing implements of adjacent fruit processing stations.

Coincident with the described peeling operation and while the peeling knife 110 operates still on the bulbous lower portion of the pear, means collectively identified by the reference numeral 169 become effective that slice off the tip or stem end of the pear which is difficult to peel. Said means comprise a narrow elongated blade 170 (Figures 1, 4, 14 and 17) which, in its ineffective position, is held above the tip of a pear impaled upon the rotary holding device 79 and radially displaced from the rotational main axis of the pear processing station. Said blade 170 is arranged to drop temporarily to a level below the tip of the pear and swing within a substantially horizontal plane with its cutting edge 171 toward said main axis of the fruit processing station. For this purpose the blade 170 is secured to the under side of a spacer block 172 of appropriate height and secured to the upper surface of said block is a feeler plate 173 which has somewhat the shape of a hatchet, as best shown in Figure 17, with its front portion arranged to project beyond the cutting edge 171 of the blade 170. The described assembly is rigidly supported from an arm 174 that turns on a horizontal pin 175 held in the end of a bracket 176, with a torsion spring 177 arranged to yieldably maintain the arm 174 in a substantially horizontal or slightly downwardly inclined position, as shown in Figures 4 and 14. The bracket 176 has the shape of an L, as best shown in Figures 15 and 16, and the tip of its bar 178 is formed into a guide loop 179 which slidably embraces a respective one of the aforementioned tubular posts 131 of the machine frame. Directly below and above the guide loops 179, each of said posts is engaged by the vertically spaced lower and upper segments 180 and 181 of guide sleeves 182 that are mounted for movement in unison on a common transverse rod or bar 183, as shown in Figures 2 and 4. To lower and raise the described mounting mechanism for the stem-end trimming knives, a pair of cams 185 is mounted upon the program shaft 66 (Figures 2 and 14) and held in engagement with the edge of each of said cams by means of a suitably arranged spring 186 is a cam follower roller 187 pivoted to an intermediate point of a lever 188 that is loosely journalled with one of its ends upon the aforementioned pivot shaft 104. The opposite end of each of the two levers 188 provided in the machine is forked, as shown at 189, and engages a stud 190 that projects laterally from a vertical actuating rod 191 which extends concentrically through a vertically aligned one of the tubular posts 131 of the machine frame. Rotatably supported upon the projecting upper end of each of the rods 191 is a lever 192 and one end of each of the levers 192 is pivotally supported from the roof 147 of the machine frame, as shown at 193, while the opposite end of each of said levers 192 projects beyond the rear end of said roof 147 and is operatively connected by an elbow linkage 194 to the aforementioned transverse ganging rod 183. Whenever the cam follower rollers 187 ride upon the circular sectors 195 of their respective control cams 185, the described trains of links and levers maintain the knives 169 positively in the ineffective elevated position, shown in full lines in Figure 14, against the urging of springs 196 that are coiled around each of the tubular posts 131 and bear against the upper segments 181 of the sleeves 182. In this position each trimming blade 170 is well above the tip of the largest-sized fruit, for which the machine is designed, and both, the trimming blade 170 and its feeler plate 173, are laterally displaced from the main axis of their respective processing stations to stand clear of a splitting knife (shown in phantom lines in Figure 14) which operates in a vertical plane containing said main axis, as will be described hereinafter.

Provided in the edge of each of the control cams 185, within the first operational quadrant thereof, is a depression 197, and when the rollers 187 drop into said depressions, the fulcrum of the levers 192 on top of the actuating rods 191 is lowered to the position shown in broken lines in Figure 14. As a result thereof the springs 196 are free to lower their associated trimming knife mountings and, as said mountings are lowered, means enter into operation that swing each trimming knife assembly 169 inwardly toward the center axis of its respective fruit processing station in two successive steps. The first of said steps moves the feeler plate 173 into said main axis below the aforementioned splitting knife, and thus during further descent of the trimming knife assembly 169 the projecting hatchet portion of said feeler plate 173 may contact the tip, and measure the height, of the pear underneath, while the cutting edge 171 of the trimming blade 170 is still kept away from the surface of the pear. The second step, however, turns the knife mounting assembly 169 sufficiently further for the cutting edge 171 of the trimming blade 170 to swing through to the rotational axis of the pear and slice the tip of the pear from the remaining pear body. To this end a camming surface 199 is formed in and along the upper end of each of the aforementioned stationary members 161 which form the peeling-knife-control rack 160, and pivoted to the inner face of each of the brackets 176 is a roller 200. Each of said rollers is held in engagement with a respective one of said camming surfaces 199 by means of a spring 201 that is tensioned between the guide loop 179 of the bracket 176 and the ganging rod 183. The camming surfaces 199 form each two distinct steps 203 and 204, as clearly shown in Figures 4, 12 and 13, and as the roller 200 comes against the upper one of said steps during downward movement of the trimming knife mounting assembly, said assembly is forced to swing from its initial angular position, as shown in full lines in Figure 15, to an intermediate position, shown in broken lines in said Figure 15 and in full lines in Figure 16, wherein the feeler plate 173 has moved below the splitting knife into the center axis of the fruit processing station. In this position the feeler plate 173 will contact, and be stopped by, the tip of a pear positioned underneath, as the trimming knife mounting assembly continues its downward journey, whereupon the arm 174 may swing upwards on its pivot pin 175 depending upon the height of the pear encountered. At the lower end of the downward journey of the trimming knife mounting assembly, the roller 200 encounters the second step 204 of the camming surface 199, which is effective to swing the trimming knife assembly 169 from the above described intermediate position shown in full lines in Figure 16 into the position shown in broken lines in said Figure 16, wherein the edge 171 of the blade 170 reaches the rotational axis of the pear and slices the tip with its stem from the pear body. Due to the presence of the feeler plates 173 the depth of the sliced-off pear tip will always be the same, no matter what the height of a pear may be, because the depth of the cut is determined by the depth of the spacer block 172 that separates the slicing blade 170 from the feeler plate 173. Furthermore, due to the fact that the edge of the slicing blade is arranged to advance only to the rotary axis of the pear-processing station, the section surface will never tilt to any appreciable degree, but will always lie substantially in a horizontal surface, varying in shape from an extremely shallow cone to an extremely shallow crater for pears of increasing height. When the rollers 187 climb back to the circular contours 195 of their respective cams 185 the described operations occur in the reverse order and direction and remove the knife assemblies 169 from the center axis of their respective processing stations and out of the path of the splitting knives so that the latter may operate freely in a manner to be presently described.

It will be noted from Figures 11, 13 and 14 that the upper end of the range of movement of the blocks 120, from which the peeling knives 119 are supported and which engage and slide along the tubular posts 131 of the machine frame, overlaps with the range of movement of the sleeves 182 which carry the trimming knives 169 and which likewise engage said tubular posts 131. The pear-tip trimming operation occurs at the beginning of the peeling operation when the peeling knives operate still on the bulbous lower halves of the pears, as has been pointed out hereinbefore. Hence, during actual performance, the trimming knives 169 will in no way be interfered with by the motion of the peeling knife mounting mechanism. In the final phase of the peeling operation, however, when the sleeves 182 of the trimming knives are at rest in their elevated positions, the rising blocks 120 of the peeling knives will come up against the sleeves 182 and due to the manner in which said sleeves are operatively connected to their actuating levers 192 by means of the aforementioned elbow linkages 194, the blocks 120 may raise said sleeves 182 against the urgency of the springs 196 as high as required for proper operation of the peeling knives, without upsetting the power train of the trimming knife mechanism. Having specific reference to Figure 14, each of said elbow linkages 194 is composed of an upper link 205 and a lower link 206, which are pivoted together, as shown at 207. The lower end of said upper link is provided at its outer edge with a flange 208 through which protrudes a set screw 208a that is arranged to engage the outer edge of the lower link 206 and limit relative motion of said links on their common pivot 207 to an angle of less than 180 degrees, so that said links are free to fold in one direction only. Thus, whenever the sleeves 182 of the trimming knives 169 are pushed upwards by the rising blocks 120 of the peeling knife carriage, the linkages 194 will simply fold on their pivot points 207, with said pivot points yielding away from the rear wall of the machine, without affecting the position of the remaining power train between the trimming knives 169 and the trimming-knife-control cams 185.

Toward the end of the peeling operation means collectively identified with the reference number 209 enter into effect that carve the seed cell from the body of the pear. For this purpose a piston 210 mounted upon a vertical rod 211 is slidably disposed within the rotating tube 82 of each rotary holding mechanism 79. Cut into the upper face of said piston is a diametrically extending groove or channel 212 and disposed within said channel is a block 214 (Figure 23). One end of said block is pivotally supported from the side walls of the channel 212, as shown at 215 in Figure 24, while its opposite end rests upon an expansion spring 216 which is received within a suitable recess 217 in the bottom of the channel 212 and normally maintains the block 214 in an elevated substantially horizontal position, as shown in Figures 21, 22 and 23. Rising from the spring supported end of the block 214 is a stud 218 that has a rounded upper end, and mounted in and rising from the center of the block 214 coaxially with the rotating tube 82 of the rotary holding device 79 is the stem 219 of a seed celling knife 220 which resembles a sickle in shape and is normally positioned within the tubular stem 85 of the impeller fins 86 below the level of said fins, as illustrated in Figures 18, 19 and 21. Means are provided to raise the seed-celling knife 220 from the defined retracted position relative to the impeller fins of the rotary holding mechanism 79 into operative position within the spheroidal space defined by said impeller fins 86. For this purpose the lower end of the piston rod 211 extends below the lower end of the tube 82 and a spring 222 coiled around the projecting end of said rod is interposed between a block 223 secured to the bottom end of said rod and an apertured fitting 224 which closes the bottom end of the tube 82 and is slidably engaged by said rod 211. The spring 222 resiliently holds the rod 211 and hence the knife 220 in a retracted position relative to the rotating tube 82 which is defined by a small stop flange 225 that is secured to the rod 211 above the fitting 224 and which bears against said fitting under the urging of said spring 222. Whenever the rotary holding device 79 is raised at the beginning of each operational cycle of the machine under the influence of the control cam 101, as has been described hereinbefore, the seed-celling knife 220 is likewise raised in space by virtue of the fitting 224 engaging the flange 225 on the rod 211 from below, as illustrated by a comparison of Figures 18 and 19, but the position of the seed-celling knife 220 relative to the fins 86 remains the same, as likewise illustrated by said Figures 18 and 19. Means are provided, however, which temporarily engage the rod 211 during the second half of each operational cycle of the machine and raise the seed-celling knife 220 from its retracted position relative to the impeller fins 86, as shown in Figures 18, 19 and 21 into an elevated position in which the seed-celling knife is situated within the spheroidal space defined by said impeller fins, as illustrated in Figure 22. For this purpose a cam 227 is keyed to the program shaft 66 and engages a roller 228 that is pivoted to the free end of an arm 229 which is firmly mounted upon the previously mentioned shaft 104. Suitable spring means 231 interposed between the arm 229 and a stationary point of the machine frame urge the roller 228 into engagement with the edge of the cam 227 such that the rotary position of the shaft 104 is varied depending on whether the roller engages a rise or a depression in the contour of said cam 227. Opposite to each pear processing unit comprised in the machine, a C-shaped link 232 is loosely journalled on the shaft 104 and pivoted to the point of the lower horizontal bar 234 of said C-shaped link is a pair of twin levers 235 that are rigidly connected for movement in unison, as shown in Figure 20. The free front ends of said levers 235 are forked, as shown at 236, so that they may operatively engage a pair of studs 238 that project laterally in opposite directions from the aforementioned block 214 at the bottom end of each of the piston rods 211. At the beginning of each operational cycle of the machine when the rotary holding device 79 is in the lowered position illustrated in Figure 18, the forks 236 are located adjacent to the lower end of the rotating tube 82, with the studs 238 at the lower end of the piston rod 211 positioned a distance below the level of both said tube and said forks. As the rotary holding device 79 is raised into operative position, however, the piston rod 211 is likewise raised, as described above, and lifts the block 214 and its studs 238 to about the level of the forks 236, whereupon operation of the cam 227 brings the forks 236 into engagement with the studs 238 and thereafter causes said forks to lift the piston rod 211 relative to the tube 82 so as to place the seed-celling knife 220 within the space defined by the impeller fins 86. For this purpose an arm 240 is firmly mounted upon the shaft 104 and suitably interposed between the under side of said arm and a shelf 241 formed by the C-shaped link 232 near its upper end is an expansion spring 242, and the end of said arm 240 is pivotally connected to the rear end of one of the twin levers 235 by an interponent 243. Whenever the shaft 104 is turned in clockwise direction, as viewed in Figures 19 and 20, as is the case when during operation of the program shaft 66 the roller 228 drops from the initial sector 244 of the control cam 227 upon the adjoining sector 245 which is of a smaller radius, the arm 240 presses downwardly upon shelf 241 of the C-shaped lever 232 and, if the spring 242 is sufficiently stiff to resist compression, urges the C-shaped link 232 to swing in clockwise direction on the shaft 104. This causes its lower point to describe a shallow and practically horizontal arc that is effective to engage the forks 236 with the studs 238, as shown in Figure 19. Said drop in the contour of the control cam 227 from its initial sector 244 of maximum radius to the adjoining sector 245 of appropriately smaller radius is timed to follow directly the elevation of the tubes 82 as effected by the control cam 65. To thereafter effect elevation of the seed-celling knife 220 into the spheroidal space within the impeller fins 86, the control cam 227 exhibits another and more pronounced drop in the final quadrant of its circumference to a sector 246 of still smaller radius, which causes the shaft 104 to turn still further in clockwise direction. The link 232 is now unable to yield further in clockwise direction due to engagement of the forks 236 with the studs 238 and the arm 240 will, therefore, compress the spring 242 and move relatively to the C-shaped link into the position indicated in broken lines in Figure 19. In so moving it rotates the twin levers 235 through interponent 243 in clockwise direction on their pivotal connection with the link 232, and due to the location of said pivotal connection slightly above the level at which the forks 236 engage the studs 238, clockwise movement of said levers 235 causes their forks to raise the piston rod 211 against the force of the spring 222 to the position shown in Figure 22, wherein the seed-celling knife 220 has left the tubular stem 85 of the impeller fins 86 and has entered the space defined by said fins. As the piston 210 reaches its uppermost position within the tube 82 of the rotary holding device 79, the aforementioned upwardly directed stud 218 in the spring-supported end of the block 214 strikes against the plug 83 which closes the upper end of the tube 82. As a result thereof said block is depressed on its pivot 215 against the urging of the spring 216 which tilts the stem 218 of the knife 220 and moves the sickle-shaped blade of said knife with its convex side adjacent to the inner concave side of the rotating fins 86. As has previously been pointed out, said fins are so positioned within the body of the pear that they encircle its seed cell. Therefore, as the blade of the knife 220 moves in the described manner radially to the periphery of the space defined by the impeller fins, while said fins keep the impaled pear in rapid motion about its center axis, the seed cell of the pear is reduced to a soft pulpy state and carved neatly out of the pear body and may, after the pear has been split in a manner to be presently described, readily be washed from the pear halves.

The depression 246 in the contour of the control cam 227, which effects the described elevation of the seed-celling knife into operative position, is of short duration only and from said depression the contour of the cam returns directly to a final sector 249 of maximum radius which is, in fact, a continuation of the hereinbefore described initial sector 244. As the cam follower roller 228 climbs back to said sector 249, it turns the shaft 104 and the actuator arm 240 in counterclockwise direction. This counterclockwise movement of said arm 240 remains, at first, without effect upon the C-shaped link 232 since the spring 242 will retain said link in its clockwise position until it has expanded to its normal condition. The counterclockwise movement of the arm 240 will, therefore, turn the twin levers 235 in counterclockwise direction on their pivotal connection with the C-shaped link 232 which causes the forks 236 to withdraw the piston 210 with the aid of the spring 222 to its retracted position relative to the impeller implement. As a result thereof the curved outer edge of the seed-celling knife comes against the upper edge of the tubular stem 85 of the impeller fins which cams the knife back into its vertical position, whereupon it is retracted into the interior of said tubular stem.

After the spring 242 has regained its normal condition, further counterclockwise movement of the arm 240 pulls the levers 235 and the C-shaped link 232 as a unit in counterclockwise direction and in this manner disengages the forks 236 from the studs 238 of the piston rod 211 so that the rotating tube 82 of the pear holding device may at the end of each operational cycle of the machine be lowered into its inoperative position without interference from the seed-celling-knife control mechanism.

With the pear peeled, trimmed and seed-celled, and while the hereinbefore described control cam 65 operates to withdraw the fins 86 from the body of the fruit in downward direction, means enter into operation that split the fruit into two halves and remove the fibres that extend from the seed cell of the fruit to the stem end thereof. For this purpose it is first necessary that the fruit be properly supported during the splitting operation. To this end the upper edge of the aforementioned outer tube 80 is turned inwardly to form a narrow flange 255, and means are provided which elevate said tube 80 during the pear splitting operation to a position wherein its flanged upper end is flush with the fruit receiving plate 25. Having specific reference to Figure 25, a pair of cams 258 is firmly mounted upon the program shaft 66, and each of said cams engages with its edge a roller 259 that is pivoted to the end of an arm 260 which is journalled on the aforementioned pivot shaft 104. An interponent 261 pivotally connects the roller-bearing end of said arm 260 with an intermediate point of a lever 262 that is loosely journalled with one of its ends upon the program shaft 66 while its other end is pivotally connected to a link 263. Both the links 263 provided in the machine engage pivotally a transverse ganging rod 264 that extends through apertured ears 265 which project radially from the lower ends of the various tubes 80 comprised in the machine. The cams 258 are of circular shape except for solitary lobes 266 the angular position of which is so adjusted upon the program shaft 66 relative to the other cams driven by said shaft, that they will raise the tubes 80 from the position shown in full lines in Figure 25 to the position shown in broken lines in said Figure 25 in the final phase of each operational cycle of the machine. In said last mentioned position the flanges 255 positively support the fruit at the level of the feed plates 25 as and after the fins 86 of the rotary holding devices 79 are removed from the body of the fruit.

The actual splitting means has the form of a knife 270 (Figure 24) composed of two blade sections 271 and 272 which extend radially from a central tube 273 of circular cross-section at diametrically opposite points thereof. Said knife is mounted above and in coaxial alignment with the main axis of the fruit-processing station P for vertically reciprocating movement from a position wherein its downwardly directed cutting edge is located above the focal space of the pear preparing operations, as shown in full lines in Figure 24, to a position wherein said edge closely approaches the level of the fruit receiving plate 25, as shown in broken lines in said Figure 24. For this purpose the knife 270 is bolted to a hilt 275 which forms two vertically spaced guide loops 276 and 277 that are axially aligned with the vertical main axis of the pear processing station and which slidably engage a vertical guide rod 278 above and below the roof portion 147 of the machine frame, within which said guide rod is rigidly held. The diameter of said guide rod is reduced at its lower end to form a downwardly projecting cylindrical ram-rod 279 of a size to fit slidably into the tube 273 and which extends all the way down to the bottom end of said tube when the knife 270 is in the elevated position shown in full lines in Figure 24. The upper guide loops 277 of all the splitting knives 270 comprised in the machine are connected for movement in unison by a transverse ganging rod 281 (Figure 2) which is engaged in the slotted ends 282 of a pair of actuating levers 283 that are rotatably supported from the roof 147 of the machine frame by suitable brackets 284. The opposite ends of said actuating levers are pivoted to the upper ends of rods 285 that extend downwardly through respective ones of the tubular posts 131 of the machine frame. The lower end of each of said rods 285 is provided with a laterally projecting stud 287 that engages the forked end 288 of an arm 289. Both the arms 289 provided in the machine are firmly mounted upon the repeatedly mentioned pivot shaft 63. Likewise, mounted upon said pivot shaft 63 for rotation therewith is another arm 290 the free end of which carries a cam follower roller 292 that engages the contour of a control cam 293 which is keyed to the program shaft 66. Said cam 293, like the cams 258, is of uniformly circular shape except for a solitary steep sided lobe 294 which is located at a point in rotary alignment with the aforementioned lobes 266 of the cams 258 and with the clockwise half of the solitary depression 107 formed in the control cams 108 of the rotary holding mechanisms 79. Thus, whenever the cam follower rollers 102 of said last mentioned mechanism drop into the depressions 107 of the control cams 108 and cause the fins 86 of the holding devices 79 to be withdrawn from the fruit, the cam follower rollers 259 ascent the lobes 266 of their respective control cams 258 and raise the flanged upper ends of the tubes 80 to support the fruit; and at the same time the cam follower roller 292 ascends the steep lobe 294 of the control cam 293 and pushes the rods 285 abruptly in upward direction which causes all the knives 270 to descend rapidly and split the fruit situated upon the flanges 255 into two halves which fall on either side of said knives onto suitable slide chutes (not shown). At the same time the tubes 273 of the knives 270 carve the cord of stem fibre strands from the interior of the pears and as the roller 292 drops from the lobe 294 of the control cam 293 in the final moments of each revolution of the program shaft 66 and returns the knives 270 to their elevated positions above the actual pear processing space P, the stationary ramrods 279 enter the tubes 273 and eject the fibrous matter that collected therein during the down-stroke of the splitting knives. The fibrous matter, thus ejected from the tubes 273, drops on to the same chutes that carry away the prepared pear halves and, like the core pulp, may be separated from said pear halves by jets of water, brine or some other suitable solution.

The sequence and relation of the operative phases of the mechanisms comprised in each of the fruit processing stations of the machine of my invention for each revolution of the program shaft 66 is illustrated in the phase diagram shown in Figure 26. In said diagram the initial and full-cycle position of the program shaft is marked by the radius 0 and each of the seven concentric circles represents one of the mechanisms comprised in a fruit processing unit, with the arcs drawn in thin lines indicating the idle phases and the arcs drawn in heavy lines indicating the operative phases, while the arcs drawn in wave lines mark the time required for the fruit processing implements to move from their positions of rest to effective positions and vice versa.

The outermost circle 301 represents the operation of the fruit gripping and centering jaws 30, 31 and its heavy arc 301b indicates that the jaws grip the fruit at the beginning of each operational cycle and deliver it to the fruit processing station while the program shaft turns over only about 12° of its full operational cycle of 360°, whereupon the jaws move back to an intermediate position along the fruit receiving plate 25, as indicated by the arc 301c, where they remain in open condition until shortly before the end of the cycle when they move back to the front end of the plate 25 to grip a new fruit, as indicated by the arc 301a. Thus, the jaws remain at rest for more than 330°, as indicated by the arc 301d before they return to grip a new fruit leaving, in fact, 350° of the full operational cycle of the machine to an operator to properly place a new fruit upon the receiver plate 25. Assuming each operational cycle of the machine to last only about 5 seconds, an operator has almost all of said 5 seconds to feed a new pear to the particular processing unit, which is far more than what he needs to properly position a new fruit upon the front end of the receiver plate. Hence, the operator may attend to several synchronously operating processing units at the same time so that the fruit-processing units of my invention lend themselves particularly well to ganging into multiple machines, such as illustrated in Figures 2 and 3, that may be attended to by a single operator.

The second circle 302 represents the operation of the rotary fruit holding mechanism 79 and indicates by the position of its operative phase 302b that the holding fins 86 of said mechanism penetrate into and begin to rotate the pear as the jaws release and move away from the fruit. The rotary fruit-holding mechanism 79 remains in operative condition and rotates the pear about its main axis over more than 315° of the total operational cycle of 360°.

The effective phase of the peeling knife 110 whose operation is represented by the third circle 303, commences at practically the same point as the operational phase of the rotary holding mechanism and lasts almost as long, as indicated by a comparison of the arc 303b with the arc 302b.

The fourth circle 304 represents the operation of the mechanism for cutting off the tip of a pear and its wave line arc 304a indicates that said mechanism moves into operative position as soon as the pear is being impaled upon the rotary holding device 79. As indicated by the adjoining arc 304b, it operates to slice off the tip of the pear in the very early moments of the peeling operation, when the peeling knife is still at the bottom of the pear, and has long returned to its position of rest, represented by the arc 304d, by the time the peeling knife reaches the shank or neck of the pear in the final moments of the peeling operation.

The fifth circle 305 represents the operation of the seed-celling mechanism 209 and shows by the position of its active phase 305b that the actual seed-celling operation occurs entirely within the operative phase of the peeling mechanism.

The sixth and seventh circles 306 and 307, respectively, represent the operation of the mechanisms involved in splitting and coring the fruit. Circle 306 represents the operation of the fruit support 80/255 and its heavy arc 306b indicates that said support takes over the task of supporting the fruit directly after the peeling operation is completed and as the fins 86 of the rotary holding device 79 withdraw from the body of the pear. The circle 307 represents the operation of the pear splitting and coring implement 270 and its heavy arc 307b marks the down stroke of said implement which occurs while the fruit is supported by the mechanism 80/255 directly after the fins 86 of the rotary holding mechanism 79 have been withdrawn. The adjoining sector 307c drawn in a wave line marks the return stroke of the pear splitting and coring implement 270 to its elevated position which reconditions said implement for renewed use by ejecting the cord of stem fibres from the tube 273 thereof.

Due to the fact that all the fruit-processing implements of the described machine are arranged to operate on the fruit with the fruit remaining in one and the same location and position, as provided for in accordance with my invention, the stem-end-cutting-off and the seed-celling operations may be arranged to occur coincident with the peeling operation, as described hereinbefore, and the fruit-coring operation may be accomplished at the same time and by the same implement as the fruit-splitting operation, as likewise described hereinbefore. In view of this telescoping of the various fruit-preparing operations and the complete absence of any transfer operations to different fruit processing stations, the total time consumed by all the fruit preparing operations is materially shorter than in any of the known fruit-processing machines of comparable performance, and all the fruit preparing implements may be actuated from a single drive shaft and the complete fruit-preparing process accomplished by a single revolution of said shaft, as above described and though the time taken by each operational cycle of the machine may be materially shorter than previously possible, the time alloted to the fruit-peeling operation may actually be longer than in machines with operational cycles of far greater duration, since the peeling operation of the described machine may last over ⅘ of its total operational cycle, as demonstrated by the sector 303b of the phase diagram, without crowding any of the other fruit-preparing operations. As a result thereof the fruit may be rotated at a relatively slow rate during the peeling operation and the peeling may yet be accomplished with a greater number of turns of the pear than practised at present, which permits the use of peeling knives having only a single curvature, as described hereinbefore, and without missing any portion of the fruit surface while maintaining the thickness of the peelings at a minimum. Furthermore, due to the aforementioned absence of any fruit transfer operations and due to the fact that the fruit is seed-celled while in a state of rotation without being gripped by jaws or clamps, bruising and other injuries to the fruit which impair its market value are held at a minimum. Moreover, due to the fact that in accordance with my invention the fruit is processed while impaled upon a holding device in its natural upright position with its heavy calyx end down, there is no danger that soft specimens may drop from the holding device so that my machine will operate satisfactorily on soft and hard fruit specimens alike. Last but not least, the mechanism for cutting off the stem end of the fruit, as comprised in the machine of my invention, enables the machine to properly process fruit disregarding variations in the height of the individual specimens, so that it is no longer necessary to grade the fruit before feeding it to the machine.

While I have described my invention with the aid of a specific embodiment thereof, it will be understood that I do not wish to be limited to the particular constructional details shown and described which may be departed from without departing from the scope and spirit of my invention.

I claim:

1. Mechanism for cutting off the stem end of pears and like fruit to a predetermined depth irrespective of variations in the height of the fruit, including in combination means adapted to hold and operable to rotate the fruit about a vertical axis in its natural position with its calyx end down and its main axis substantially aligned with the axis of rotation; a knife structure disposed above a fruit held by said holding means in the defined position, and comprising a blade having a cutting edge and a feeler member supported from and a predetermined distance above said blade, said member having an extension projecting laterally beyond the cutting edge of said blade; means operable coincident with rotation of said holding means to lower said knife structure in a position wherein its extension is intersected by the axis of rotation of said holding means and its cutting edge is laterally displaced from said axis until said extension comes into contact with the tip of the fruit; and means operable upon such contact, and while said holding means is still effective to rotate the fruit, to move said knife structure laterally until its cutting edge reaches said axis of rotation.

2. Mechanism according to claim 1, wherein said knife structure is supported by an arm that is mounted for rotation about a substantially horizontal axis, and including spring means arranged to yieldably hold said arm in a substantially horizontal position.

3. Arrangement for receiving and holding a fruit such as a pear, an apple or the like in its natural position with its calyx end down and its main axis extending vertically, including in combination a substantially horizontally positioned fruit-receiving plate, an impaling implement disposed a limited distance beyond the rear edge of said plate and comprising a vertically positioned stem, a plurality of arcuate fruit impaling fins supported from the upper end of said stem along the circumference thereof said fins having an external diameter transversely of the stem axis substantially less than that of a fruit to be impaled thereby, said fins being formed and arranged to leave an internal space of a size and conformation adapted to accommodate the seed cell of the particular type of fruit for which the mechanism is designed, means operable to carry a fruit slidably along and beyond said plate with its calyx end supported upon said plate until the main axis of the fruit is vertically aligned with the axis of said implement, and means operable to raise said implement from a retracted position wherein said fins are disposed below the level of said plate to an elevated position wherein said fins have penetrated axially of said fruit and encircled the seed cell of a fruit held beyond the end of said plate in the above defined position.

4. Arrangement for receiving and holding a pear in its natural position with its calyx end down and its main axis extending vertically, including in combination a substantially horizontally positioned fruit-receiving plate, an impaling implement disposed a limited distance beyond the rear edge of said plate and comprising a vertically positioned stem, a plurality of arcuate fins supported from the upper end of said stem along the circumference thereof and arranged to leave an internal space of a size and conformation adapted to accommodate the seed cell of a pear, said fins having an external diameter transversely of the stem axis substantially less than that of a fruit to be impaled thereby, means operable to carry a pear along and beyond said plate with its calyx end supported upon said plate until the main axis of the pear is vertically aligned with the axis of said implement, and means operable to raise said implement from a retracted position wherein said fins are disposed below the level of said plate to an elevated position to penetrate the pear along its main axis to a distance wherein the center point of the space defined by said fins is located about 7/8 of an inch above the level of said plate.

5. Arrangement for receiving and holding a pear, apple or like fruit in its natural position with its calyx end down and its main axis extending vertically, including in combination a substantially horizontally positioned fruit-receiving plate; an impaling implement disposed a limited distance beyond the rear edge of said plate and comprising a vertically positioned stem, a plurality of fins in the form of semi-circular straps with cutting edges on the upper ends thereof supported from the upper end of said stem along the circumference thereof and arranged to enclose a space of a size and conformation adapted to receive the seed cell of the particular type of fruit for which the mechanism is designed said fins being of an extent insufficient to sever a fruit impaled thereon with its seed cell within said space, and a spike mounted upon the converging upper ends of said fins in coaxial alignment with and terminating short of said stem; means operable to carry a fruit along and beyond said plate with its calyx end slidably supported upon said plate until the main axis of the fruit is in vertical alignment with the axis of said implement; and means operable to raise said implement from a retracted position wherein said spike is disposed below the level of said plate to an elevated position wherein said spike has penetrated said fruit along its main axis to lie wholly beyond the seed cell of the fruit and said fins have penetrated into and encircle the seed cell of a fruit held beyond the end of said plate in the above defined position.

6. A mechanism for seed-celling pears, apples and like fruit, including in combination holding means for the fruit comprising a rotary tubular stem, a plurality of fruit impaling fins supported from said tubular stem to rotate therewith and arranged along substantially radially planes to enclose a space, intermediately thereof, of a size adapted to accommodate the seed cell of the fruit for which the mechanism is designed, said fins having an external diameter to lie wholly within a fruit impaled thereon, means operable to rotate said holding means about its axis, a seed-celling knife mounted for axial and relative rotative movement within said tubular stem, and means operable to move said knife from a retracted position to a position within the space defined by said fins.

7. A mechanism for seed-celling pears, apples and like fruit, including in combination holding means for the fruit comprising a tubular stem, a plurality of arcuate fins supported from an end of said tubular stem and arranged along substantially radial planes to enclose a space of a size adapted to accommodate the seed cell of the fruit for which the mechanism is designed, means operable to rotate said holding means about its center axis, means for impaling a fruit along its main axis upon said stem to enclose the seed cell of the penetrated fruit within said fins, a seed-celling knife mounted for relative axial and rotative movement within said stem, means operable to move said knife from a retracted position axially beyond said fins to a position within the space defined by said fins, and means mounted to move said knife radially away from the center axis of said tubular stem to sweep the space enclosed by said fins and sever the seed cell therefrom.

8. A mechanism for seed-celling pears, apples and like fruit, including holding means for the fruit comprising a tubular stem, a plurality of arcuate fins with sharpened outer edges supported upon and projecting radially from the outer end of said tubular stem along the circumference thereof and arranged to define an intermediate space of a size adapted to receive the seed cell of the fruit for which the mechanism is designed, means for penetrating a fruit along its main axis with said fins and said stem to enclose the seed cell of the fruit within the space defined by said fins, means operable to rotate said holding means about its center axis, a seed-celling knife mounted for relative rotative movement within the space defined by said fins, and means operable to move said knife from a position within said tubular stem to a position adjacent the inner edges of said fins during rotation thereof to sever the seed cell from the fruit.

9. A mechanism according to claim 8 wherein said knife is of sickle-shape and is arranged to move with its outer convex edge adjacent to the inner concave surface defined by the rotating fins.

10. Mechanism according to claim 8 wherein said knife is mounted upon a lever moveable about a pivot normal to the axis of stem rotation and comprising spring means arranged to yieldably maintain said lever in a position in which said knife is vertically aligned with said tubular stem, and means engaging said lever upon elevation of said knife to vary its pivotal position against the urging of said spring means.

11. Mechanism for seed-celling pears, apples and like fruit including in combination a substantially horizontally disposed fruit-receiving plate having a front end and a rear end, feed means carrying fruit with its calyx end down and in contact with the upper surface of said plate from the front end to and beyond the rear end thereof; holding means arranged adjacent to the rear end of said plate comprising a vertically positioned tubular stem, a plurality of arcuate fins projecting radially from the upper end of said tube circumferentially thereof and arranged to define an inner space adapted to accommodate the seed cell of a fruit of the type for which the mechanism is designed; means operable to raise said holding means from a position wherein said fins are disposed below the level of said plate to a position above the level of said plate wherein said fins have impaled, and encircle, the seed cell of a fruit held by said feed means beyond the rear end of said plate; a seed-celling knife mounted within the tubular stem of said holding means independently thereof; means operable to turn said holding means about its vertical center axis; means operable coincident with said turning means to raise said seed-celling knife from a retracted position within said tubular stem to an elevated position wherein it is located within the space defined by said fins; and means effective upon elevation of said seed-celling knife to tilt said knife in a radial direction away from the center axis of said tubular stem.

12. Mechanism for seed-celling canning pears including in combination a substantially horizontally disposed feed plate having a front end and a rear and, feed means carrying a pear with its calyx end down and in contact with the upper surface of said plate from the front end to and beyond the rear end thereof; holding means arranged adjacent to the rear end of said plate comprising a vertically positioned tubular stem, a plurality of fins projecting radially from the upper end of said tubular stem circumferentially thereof and arranged to define an inner space adapted to accommodate the seed cell of a canning pear and a spike mounted above said fins in coaxial alignment with said tubular stem; means operable to raise said holding means from a position wherein said spike is below the level of said plate to a position wherein the center point of the space defined by said fins is about ⅞ of an inch above the level of said plate; a seed-celling knife mounted within the tubular stem of said holding means independently thereof; means operable to rotate said holding means about its center axis; means operable coincident with said rotating means to raise said seed-celling knife from a retracted position within said tubular stem to an elevated position wherein it is located within the space defined by said fins; and means effective upon elevation of said seed-celling knife to tilt said knife in radial direction away from the center axis of said tubular stem.

13. A device for trimming the stem ends of pears and like fruit, comprising a rotatable fruit holder constructed and arranged to hold and rotate a fruit about its stem calyx axis with its stem end exposed, a yieldable blade support mounted axially beyond said fruit holder clear of the stem end of a fruit mounted thereon, a blade mounted on the blade support, said blade having a cutting edge thereof disposed at right angles to the axis of fruit rotation on said holder, a blade positioner secured in accurately spaced relation beyond said blade from a fruit on said holder, said blade positioner extending beyond the cutting edge of said blade, means for moving the blade holder with said blade and positioner axially toward the stem end of a fruit rotating axially on said holder to bring the blade positioner into contact with the exposed stem end of the fruit, and means mounted to swing said fruit and said blade holder relatively transversely of the axis of fruit rotation to move the cutting edge of the blade into the fruit to its axis of rotation to sever the stem end of the fruit to a depth determined by the amount of separation between the blade and the blade positioner, the blade holder being yieldable lengthwise of the axis of fruit rotation.

14. In a fruit preparation machine, holding means for pears, apples and like fruit comprising a stem, a plurality of arcuate fins projecting radially from said stem, said fins being of such size and conformation as to lie wholly within a fruit penetrated thereby and to define a clear space, intermediately thereof, that is adapted to accommodate the seed cell of the fruit for which the holding means is designed, means for inserting said stem and said fins into a fruit along its stem blossom axis to drive said fins through the seed cell to a position enclosing the seed cell and clear thereof, a seed cell knife movable beyond said stem into the clear space intermediately of said fins, and means for rotatively moving the seed cell knife relative to the fins and to a fruit impaled thereon to circumscribe the seed cell and sever it from the fruit.

15. In a fruit preparation machine, holding means for pears, apples and like fruit comprising a stem and a plurality of fins in the shape of semi-circular planiform straps supported upon and projecting radially from said stem along the circumference thereof, said fins being of such size and conformation as to lie wholly within a fruit penetrated thereby and to define a clear space, intermediately thereof, that is adapted to accommodate the seed cell of the fruit for which the holding means is designed, a spike mounted upon the upper converging ends of said fins in coaxial alignment with said stem and terminating short of said stem, means for inserting said spike, said stem and said fins into a fruit along its stem blossom axis to drive said fins through the seed cell to a position enclosing the seed cell and clear thereof, a seed cell severing knife movable radially beyond said stem into the clear space within said fins, and means for rotatively moving the seed cell knife relative to said fins and to a fruit impaled thereon to circumscribe the seed cell and sever it from the fruit.

WILLARD B. COONS.

References Cited in the file of this patent

UNITED STATES PATENTS

| Number | Name | Date |
|---|---|---|
| 251,982 | Whittemore | Jan. 3, 1882 |
| 1,263,922 | Nelon | Apr. 23, 1918 |
| 1,269,390 | Coons | June 11, 1918 |
| 1,442,859 | Coons | Jan. 23, 1923 |
| 1,484,446 | Felizianetti | Feb. 19, 1924 |
| 1,565,960 | Reynolds | Dec. 15, 1925 |
| 1,823,854 | Coons | Sept. 15, 1931 |
| 1,950,718 | Duncan | Mar. 13, 1934 |
| 1,979,322 | Ewald | Nov. 6, 1934 |
| 2,075,750 | Pease | Mar. 30, 1937 |
| 2,179,529 | Thompson | Nov. 14, 1939 |
| 2,187,075 | Coons | Jan. 16, 1940 |
| 2,342,131 | Erickson | Feb. 22, 1944 |
| 2,343,098 | Thompson | Feb. 29, 1944 |
| 2,383,814 | Richardson | Aug. 28, 1945 |
| 2,397,007 | Hosmer | Mar. 19, 1946 |
| 2,429,749 | Dunn | Oct. 28, 1947 |